March 1, 1949. R. R. WEBB 2,463,131
ACCOUNTING TRAY
Filed April 9, 1945
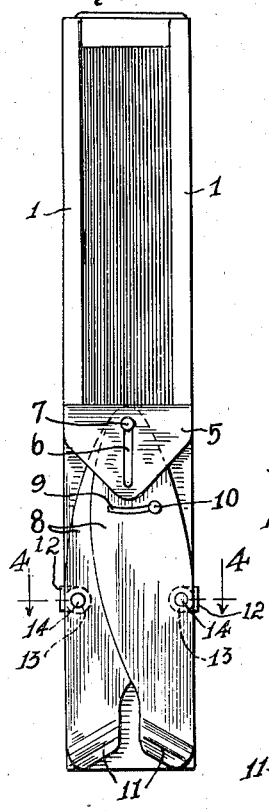
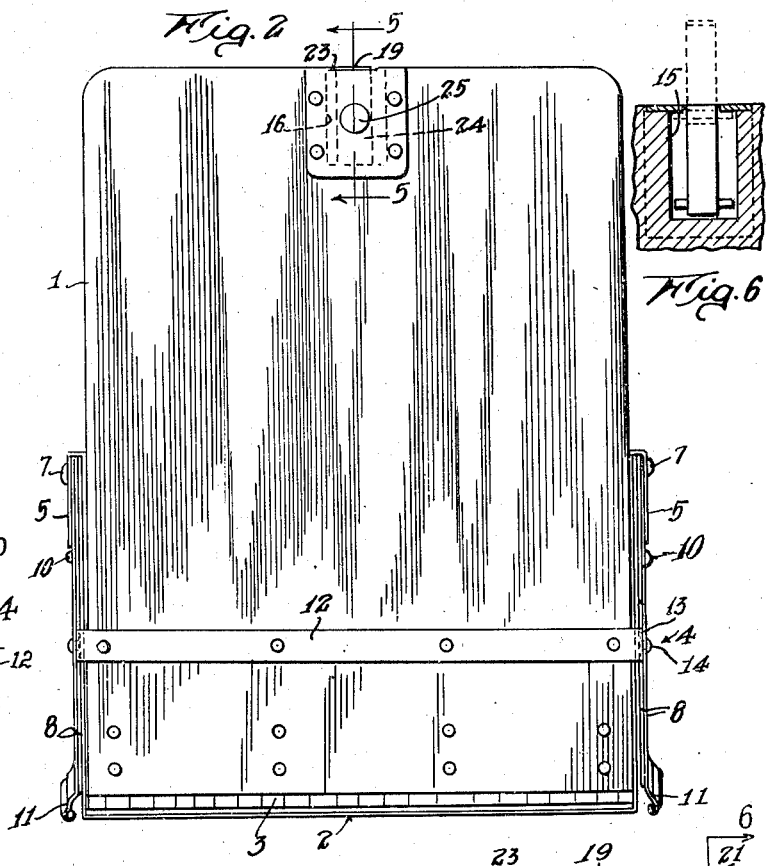
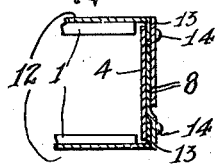
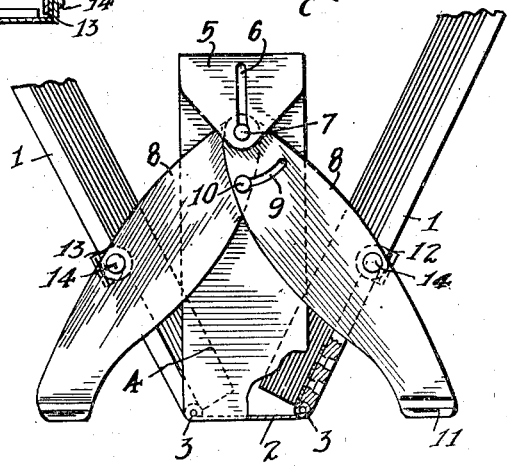
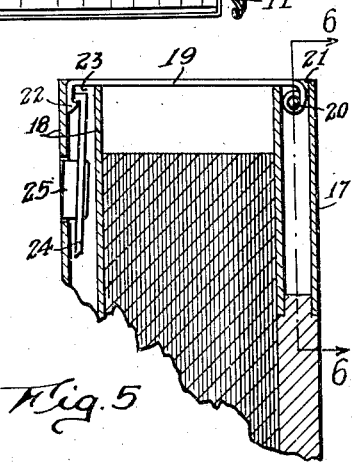
Inventor
Robert R. Webb
By Lyon & Lyon
Attorneys Patented Mar. 1, 1949

2,463,131

UNITED STATES PATENT OFFICE 2,463,131

ACCOUNTING TRAY

Robert R. Webb, Los Angeles, Calif., assignor to Charles R. Hadley Company, Los Angeles, Calif., a corporation of California Application April 9, 1945, Serial No. 587,403

11 Claims. (Cl. 129—43)

My invention relates to accounting trays, that is, to trays designed to hold various accounting records in convenient proximity to the user, and serves as a container for the accounting records when not in use. Among the objects of my invention are:

First, to provide an accounting tray which incorporates a novel folding stand structure which, when the accounting tray is opened, supports the tray in stable relation so that it will not readily close or fall over, and when the accounting tray is folded, likewise folds compactly and occupies a minimum amount of space at the ends of the accounting tray so that the accounting tray may be conveniently stacked.

Second, to provide an accounting tray having a permanently incorporated stand which requires no extra handling or adjusting, but functions automatically.

Third, to provide an accounting tray which incorporates a novel latch for holding the tray closed and which coacts with the stand structure to retain the records within the accounting tray when closed, the latch being so arranged that it is entirely out of the way when the accounting tray is open.

With the above and other objects in view as may appear hereinafter, reference is directed to the accompanying drawings, in which:

Fig. 1 is an end view of the accounting tray when closed.

Fig. 2 is a side view thereof also when closed.

Fig. 3 is an end elevational view of the accounting tray when opened, the tray being shown fragmentarily.

Fig. 4 is a fragmentary sectional view through 4—4 of Fig. 1, showing details of the stand construction.

Fig. 5 is a fragmentary sectional view through 5—5 of Fig. 2, showing the latch means when the accounting tray is closed.

Fig. 6 is a fragmentary sectional view through 6—6 of Fig. 5, showing the manner in which the latch bar is stored when not in use; that is, when the accounting tray is opened.

My accounting tray includes a pair of side plates 1 of sufficient length and breadth to accommodate various accounting records. These records are usually on single sheets of relatively stiff paper, or may be a composite of several sheets depending upon the nature of the record. It is desirable that they be readily accessible when in use and be closed together in compact form for storage in a minimum amount of space when not in use. It has been customary to place such records in various loose-leaf book devices so arranged that the individual records may be inserted or removed. Such loose-leaf book devices are clumsy to handle, and heretofore have required various extraneous supporting devices in order to hold them in a convenient open position. Such supporting devices are often lost or misplaced, and in any event take up space which is often at a premium.

The side plates 1 are joined to a base plate 2 which extends the length of the side plates and is joined thereto by hinges 3. The side plates may be formed of wood or plastic, or light weight composition material, but it is preferred to make the base plate 2 and the hinges 3 of metal.

The base plate 2 defines the width of the accounting tray when closed, and is provided at each end with an upturned end member 4 which may be integral therewith. Each end member occupies approximately half the height of the side plates 1, and its upper end is doubled downward or folded as indicated by 5. Each folded portion 5 is provided with a vertical slot 6 which slidably receives a journal pin 7. Each journal pin pivotally connects a pair of struts or brace levers 8 formed of sheet material, and the upper ends of which fit between the end members 4 and their folded portions 5. Each pair of struts 8 is movable between a folded position in which the struts overlie each other and are within the boundaries of the corresponding end member 4 as shown in Fig. 1, and an extended position in which the struts 8 diverge from each other. The relative movement of the members of each pair of struts is determined by an arcuate slot 9 in one of the struts and a pin 10 extending therein and secured to the other of said struts. The extremities of the struts are provided with foot pads 11 and are so shaped that when the struts are in their extended or diverging relation the faces of the feet 11 are coplanar with each other and the base plate 2.

The side plates 1 are provided with strips 12 extending from end to end and which terminate in inturned journal elements 13 adapted to fit between the struts 8 and the corresponding end members 4. The material of the strut members may be provided with circular raised bosses to accommodate the journal elements 13 which are connected thereto by pins 14.

By reason of the connections afforded between each pair of struts 8 and their end member 4 as well as the connections intermediate the ends of the struts 8 and the side plates 1, the struts are caused to move between the folded position shown in Fig. 1 and the extended position shown in Fig. 3 merely by opening or closing the side plates; when the struts are folded, they occupy no appreciable space. When extended they support the accounting tray in stable equilibrium.

In order that the accounting records may be restrained within the accounting trays when the accounting tray is closed, irrespective of how the accounting tray may be tilted, there is provided a latch and retainer structure shown best in Figs. 2, 5 and 6. The side plates 1 are provided with pockets 15 and 16 cut into the central portions of their upper ends. These pockets are encased by latch housings 17 and 18, respectively, formed of sheet metal and set with their side walls flush with the surface of the side plates. One of the latch housings contains a latch bar 19 in the form of a strap having a looped end through which extends a cross bar 20. The latch housing 17 is provided with an opening 21 through which the latch bar 19 extends, but which will not pass the cross bar 20. Thus the latch bar 19 may be concealed within its housing as indicated by dotted lines in Fig. 5, or extended laterally to the other latch housing 18.

The extended end of the latch bar 19 is provided with a latch head or hook 22 which enters the latch housing 18 through an opening 23. Within the housing 18 is a keeper spring 24 anchored at its lower end and provided with a shoulder positioned for engagement by the latch head 22. The keeper spring carries a button 25 which registers with an opening in the side of the latch housing 18, so that it may be engaged by one's finger or thumb, to unlatch the bar 19.

When the latch bar is secured, two sides of the accounting tray are held closed in the position shown in Fig. 1, and when closed the latch bar coacts with the base plate 2 and end members 4 to hold the loose leaf accounting records within the accounting tray. When the accounting tray is opened to the position shown in Fig. 3, the latch bar is within its housing 17 and out of the way.

Many other embodiments of the invention may be resorted to without departing from the spirit of the invention.

I claim:

1. An accounting tray comprising: a base panel; end plates extending upwardly therefrom; side panels hinged to said base panel between said end plates and adapted to open into diverging relations; and a pair of struts slidably and pivotally connected with said end plates, pivotally connected with said side panels and with each other, each pair of struts movable between a closed position within the confines of the corresponding end plate and an open position diverging downwardly from said end plate beyond said side panels.

2. An accounting tray comprising: a base panel; end plates extending upwardly therefrom, side panels hinged to said base panel between said end plates and adapted to open into diverging relation; a pair of struts for each end plate, said struts being pivotally connected directly to each other and slidable relative to said end plate; means extending from said side panels for journalling said struts intermediate their ends whereby upon opening said side panels into diverging relation said struts are likewise opened into diverging relation, but in a direction opposite from said side panels to form supporting feet at their extremities.

3. An accounting tray comprising: a base panel; end plates extending upwardly therefrom; side panels hinged to said base panel between said end plates and adapted to open into diverging relation; a pair of struts for each end plate, said struts being pivotally connected together and to said end plate by their upper ends and extending therefrom toward the base panel; and means pivotally connecting each strut to a corresponding side panel intermediate the ends of the strut and above the base edge of the side panel, whereby upon opening said side panels said struts are spread apart; and feet elements at the extremities of said struts adapted, when said struts are spread apart, to occupy a plane coincident with the plane of said base panel.

4. An accounting tray comprising: a frame structure including a base panel and upstanding end plates at the extremities thereof; side panels hinged along the edges of said base panel between said end plates and adapted to open into diverging relation; a pair of brace levers of sheet material overlying each end plate; means pivotally connecting each of said levers intermediate its ends to a corresponding side panel; means pivotally connecting said levers to each other and to the upper portions of said end plates whereby upon opening of said side panels the lower ends of said levers are spread laterally from their end plates; and means at the lower extremities of said levers adapted when said levers and side panels are spread open to form supporting feet.

5. An accounting tray comprising: a bottom panel, upstanding end plates at the extremities thereof; a pair of brace levers pivotally connected to each other and to each end plate and movable between a closed position overlying and within the boundaries of the corresponding end plate and an extended position wherein the lower ends of said brace levers are spread laterally from said bottom panel and in coplanar relation therewith; a pair of side panels hinged to said bottom panel between said end plates and adapted to move between a parallel disposed closed position and an upwardly diverging position; and means operatively connecting said side panels and brace levers to swing the side panels simultaneously to their open and closed positions.

6. An accounting tray, comprising: a frame structure including a base plate, integral upstanding end plates, the upper extremities of said end plates having downwardly directed folded portions spaced from the outer sides of said end plates, at least said folded portions having vertical slots; a pair of strut members; journal means slidable in said vertical slots and pivotally connecting said strut members; side panels hinged to said base plate between said end plates for movement between parallel closed positions and diverging open positions; and means pivotally connecting said struts intermediate their ends to corresponding side panels whereby said pairs of struts are caused to diverge in a direction opposite from said side panels as said side panels are opened.

7. An accounting tray, comprising: a frame structure including a base plate, integral upstanding end plates, the upper extremities of said end plates having downwardly directed folded portions spaced from the outer sides of said end plates, at least said folded portions having vertical slots; a pair of strut members; journal means slidable in said vertical slots and pivotally connecting said strut members; side panels hinged to said base plate between said end plates for movement between parallel closed positions and diverging open positions; means pivotally connecting said struts intermediate their ends to corresponding side panels whereby said pairs of struts are caused to diverge in a direction opposite from said side panels as said side panels are opened; and means for limiting divergent movement of said pairs of struts thereby to limit divergent movement of said side panels.

8. An accounting tray, comprising: a frame structure including a base plate and upright end plates folded at their upper extremities; a pair of struts for each end plate, said struts of each pair being pivotally connected to each other at their upper extremities and said upper extremities being vertically slidable within the folded upper extremities of said end plate, said pair of struts being movable between a closed position substantially within the vertical boundaries of said end plates and an open downwardly divergent position with their lower extremities coplanar to support said frame structure; side panels hinged to said base plate and movable between closed position within the vertical boundaries of said end plates and an open upwardly divergent position; and means pivotally connecting said side panels and struts to cause simultaneous movement of said side panels and struts.

9. An accounting tray, comprising: a frame structure including a base plate; upstanding end plates at the ends of the base plate, the upstanding end plates being provided with vertical slots; an element on each of said end plates slidably mounted in said slots; a pair of strut members pivotally connected to each of said elements; side panels hinged to said base plate between said end plates for movement between parallel closed positions and diverging open positions; and means pivotally connecting said strut members intermediate their ends to corresponding side panels whereby said pairs of strut members are caused to diverge in a direction from said side panels as said side panels are opened.

10. An accounting tray, comprising: a frame structure including a base plate; upstanding end plates at the ends of the base plate, the upstanding end plates being provided with vertical slots; an element on each of said end plates slidably mounted in said slots; a pair of strut members pivotally connected to each of said elements, said strut members being movable between a closed position substantially within the vertical boundaries of said end plates and an open downwardly divergent position with their lower extremities coplanar to support said frame structure; side panels hinged to said base plate and movable to closed position within the vertical boundaries of said end plates and an open upwardly divergent position; and means pivotally connecting said side panels and strut members to cause simultaneous movement of said side panels and strut members.

11. An accounting tray, comprising a base panel; end plates extending upwardly therefrom; side panels hinged to said base panels between said end plates and adapted to open into diverging positions and a pair of supporting struts pivotally connected with said side panels, the end plates having vertical slots in the upper portions thereof; an element on each of said end plates movable in said slots, each pair of struts being connected at their upper ends to one of said elements and each pair of struts being movable between a closed position within the confines of the corresponding end plate and an open position diverging downwardly from said end plate beyond said side panels.

ROBERT R. WEBB.

REFERENCES CITED

The following references are of record in the file of this patent:

UNITED STATES PATENTS

| Number | Name | Date |
|---|---|---|
| 522,237 | Sexton | July 3, 1894 |
| 1,257,299 | Allison | Feb. 26, 1918 |
| 1,375,794 | McSheehy | Apr. 26, 1921 |
| 1,839,902 | Straubel | Jan. 5, 1932 |
| 1,918,664 | Rasmusson | July 18, 1933 |

FOREIGN PATENTS

| Number | Country | Date |
|---|---|---|
| 174,840 | Great Britain | 1922 |
| 189,251 | Great Britain | 1922 |
| 373,396 | Germany | 1923 |
| 579,728 | Germany | 1933 |